United States Patent [19]

Smith-Johannsen

[11] 4,209,339

[45] Jun. 24, 1980

[54] CEMENT COMPOSITIONS

[75] Inventor: Robert Smith-Johannsen, Incline Village, Nev.

[73] Assignee: Norcem A/S, Oslo, Norway

[21] Appl. No.: 912,837

[22] Filed: Jun. 5, 1978

[51] Int. Cl.$^2$ .................. C04B 9/02; C04B 9/14
[52] U.S. Cl. .................................................. 106/106
[58] Field of Search ..................... 106/105, 106, 107

[56] References Cited

U.S. PATENT DOCUMENTS

| | | | |
|---|---|---|---|
| 2,717,841 | 9/1955 | Biefeld et al. | 106/107 |
| 3,573,941 | 4/1971 | Edwards et al. | 106/107 |
| 3,667,978 | 6/1972 | Vassilevsky et al. | 106/107 |
| 3,751,275 | 8/1973 | Oken | 106/104 |

*Primary Examiner*—James Poer
*Attorney, Agent, or Firm*—Pennie & Edmonds

[57] ABSTRACT

Water resistant magnesium oxychloride hydrate (Sorel cement) compositions and processes for producing the same. The processes comprise the addition of an ethyl silicate and/or a premix of magnesium chloride and magnesium oxide to the magnesium oxychloride hydrate reaction mixture ($MgCl_2 + MgO$) followed by the subsequent reaction and curing thereof.

22 Claims, No Drawings

CEMENT COMPOSITIONS

BACKGROUND OF THE INVENTION

Sorel cement is a term used to refer to various compositions having as basic ingredients a combination of magnesia (MgO) and magnesium chloride ($MgCl_2$) in an aqueous solution. This basic Sorel formula system when cured is a magnesium oxychloride hydrate.

Sorel cement was discovered almost 100 years ago. It gets harder, and sets faster than Portland cement, but its widespread use has been greatly limited because of its inherent poor water resistance. The magnesium oxychloride hydrate crystals that compose the Sorel cement have been found to have a structure very much like gypsum in that the physical properties of the cement depend on an intimate infiltration of the crystals, one with another, but with no real bond between the crystals. The Sorel cement product is also somewhat soluble in water with the result that exposure to water virtually eliminates the adhesion between the crystals.

Various attempts have been made to overcome this difficulty such as the addition of materials which have the property of forming insoluble magnesium salts, such as phosphates and aluminates. The results have been only partially successful and in fact usually with the further disadvantage that the hardening rate is greatly slowed.

Various fillers have been reported in the literature, but mainly from the point of view of their compatibility rather than that they impart any special properties to the cement. Glass fibers have been tried with some success, but the bond between the glass fibers and the Sorel cement is destroyed by exposure to water and thus the structural advantages of the glass fibers are only temporary.

It is obvious from repeated statements in the literature that had it not been for the water sensitivity of Sorel cement products, their use would have been much more general and wide spread. It is exactly because of this drawback of these cement products that there remains a large potential for these materials if the water sensitivity problem could be solved. The superior hardening rate, greater strength and excellent fire retardant properties of Sorel cement could then be taken advantage of in a host of building materials where its use is presently not considered.

SUMMARY OF THE INVENTION

The present invention relates to water/moisture resistant magnesium oxychloride hydrate (Sorel cement) formulae compositions and processes for producing the same. The processes comprise the addition of an ethyl silicate and/or a Premix formula of magnesium chloride and magnesium oxide to the magnesium oxychloride hydrate reaction mixture ($MgCl_2$+MgO) followed by the subsequent reaction and curing thereof. The invention further comprises the addition of various substances, reinforcing materials or fillers such as glass fibers to the compositions of this invention.

DETAILED DESCRIPTION OF THE INVENTION

Applicant has discovered that the aforediscussed disadvantage of present day Sorel cement formulae, and especially as relates to the very poor stability in and sensitivity to water of the resulting cement products, can be largely overcome either by addition of a certain material to the standard Sorel cement formula or developing a formula and processes which will result in greater stability and strength.

To this end, and as concerns the former case, applicant has discovered that when an ethyl silicate is added to a standard Sorel cement formula there results a material whose water resistance and strength properties are considerably improved. Although the exact order of addition of the reactants, the relative amount of reactants and the condition under which the reaction is to take place are not critical, it has been found advantageous to first mix and dissolve the $MgCl_2.6H_2O$ in the water, after which the MgO is dispersed. Subsequent to this the ethyl silicate is dispersed therein, preferably under conditions of high agitation. Although, as noted, the amount of ethyl silicate is not critical and the same need only be added in a water stabilizing amount, it has been found advantageous to add from about 0.5-2% by weight of ethyl silicate based upon the total weight of the Sorel cement formula. The resulting formula may then be cured under normal and well known conditions such as at room temperature and over an extended period of time.

The other mode of achieving substantially improved water stability and strength involves improving the solution of the MgO in the $MgCl_2$ in accord with the nucleation theory of this aspect of the invention as the same explained in more detail below. The improved results are obtained by first preparing a Premix formula which is comprised of water, a relatively large amount of $MgCl_2.6H_2O$ and a relatively small amount of MgO. The Premix formula is thereafter added to a standard Sorel cement formula and acts, in effect, as a seeding solution. Particularly improved results are obtained when the Premix formula is added to a Sorel cement formula which contains ethyl silicate in accord with the first aspect of this invention.

More particularly, it is preferred that the Premix formula be prepared under such conditions that $MgCl_2$ concentration in solution is maximized, this will in turn increase the solubility of MgO and the resulting formation of magnesium oxychloride hydrate. To this end, it is preferred that a near saturated solution of $MgCl_2$ and water, preferably dionized water, be prepared at or near the boiling point (about 120° C.). This will insure that there results a concentrated solution of $MgCl_2$ and increased solubility of MgO so that when a small amount of the MgO is added to the solution, preferably under conditions of vigorous stirring, the same will quickly and almost completely react with the $MgCl_2$ to form the magnesium oxychloride hydrate. As can be seen from the foregoing, the relative amounts of the $MgCl_2$, MgO and water reactants in the Premix formula, as well as the reactive conditions, are not critical, it being only required that substantially all of the MgO react to form the magnesium oxychloride hydrate.

The order in which the ingredients of the Sorel cement formula of this aspect of the invention are admixed, including the Premix formula constituent thereof, as well as the relative amounts of each such ingredient and the conditions under which admixture is to take place, are not critical. The same applies also in the case wherein the Sorel cement formula contains ethyl silicate in accord with the first aspect of this invention. It is, however, preferred to first dissolve all of the $MgCl_2.6H_2O$ in all of the water that is to be used, preferably at room temperature, and to thereafter add the Premix formula. As noted, the amount of Premix formula that is added is not critical, it only being required that the Premix formula be added in an amount sufficient to effectuate nucleation. It has been found, however, that the Premix formula may advantageously be added in an amount of from about 1-5% by weight based on the total weight of the Sorel cement formula. After the Premix formula is added, the entire amount of MgO that is to be used is added. In the case where ethyl silicate is to be employed, the same is finally added. The resulting Sorel cement formula may then be cured under normal and well known conditions such as at room temperature and over an extended period of time.

It should be observed that the Sorel cement formulae of the present invention may contain other ingredients besides $MgCl_2 \cdot 6H_2O$, MgO and $H_2O$, as these other ingredients are customary and well known in the art. These include ferrous chloride, feltspar, a release agent, etc.

Moreover, particular strength, both wet and dry strength as these properties are discussed below, may be imparted to the Sorel cement formulae of the present invention by incorporating therein reinforcing or filler materials, and particularly glass fibers. It has been found that the Sorel cement formulae of the present invention, contrary to the other conventional Sorel cement formulae, tend to bond exceptionally well to the reinforcing material which is admixed therewith and to remain well bonded under all conditions. The relative amount of the reinforcing material, i.e., glass fibers, in the Sorel cement formulae of this invention is not critical and will be easily determined by one skilled in the art, it being only required that the same be added in a strength increasing amount—from about 1-10% by weight being more than adequate to yield the desired strength characteristics—and in such a manner as to insure that the glass fibers are uniformly and well distributed and dispersed within the Sorel cement formulae.

The method under which the Sorel cement formulae of the present invention are cured is, as noted, not critical and techniques and conditions conventional in the art may be employed. It has been found, however, that yet added water stability and resulting increase in strength can be realized when curing takes place under relatively saturated atmospheric conditions.

While applicant does not wish to be bound by any specific theory, it is believed that Sorel cement consists essentially of a combination of magnesium oxide (MgO), magnesium chloride ($MgCl_2$) and water ($H_2O$) in which the reactions that take place when these three components are mixed are, in the most simple terms, as follows:

(1) Solution of magnesium oxide;
(2) Hydration of magnesium oxychloride; and finally
(3) Precipitation of magnesium oxychloride hydrate.

The material thus formed has been found to have an intermeshed crystal structure whose properties depend on its density and the bond between the crystals.

It is assumed that it is the hydration reaction that is exothermic and which produces the magnesium oxychloride hydrate crystals of the Sorel cement. But this hydration can occur only after sufficient MgO has dissolved to form an aqueous ion mix that is supersaturated with respect to the oxychloride hydrate. Once hydration becomes dominant, the free water is removed and the dissolution of MgO stops. If, at this time, insufficient MgO has dissolved to react with all the $MgCl_2$ present, then the end product will consist of an intimate mixture of crystals of magnesium oxide, magnesium chloride hydrate and magnesium oxychloride hydrate. This material would be weak because the residual MgO cannot contribute to the new crystal entanglement, and hence to the strength and stability of the cement, and it would be very sensitive to water exposure since the magnesium chloride is soluble and is easily leached out, eliminating the necessary intimate contact between the magnesium oxychloride hydrate crystals which is responsible for the stability and strength of the end-product cement material.

If this physical picture is correct, it would suggest the possibility of a greatly improved Sorel cement formula provided that these reactions could be controlled and residual $MgCl_2$ eliminated—that is, if the solution of the MgO can be completed before the hydration reaction starts. The foregoing would appear to depend on the phenomenon of nucleation. This phenomenon may be visualized and understood by considering the two essential features of the cement production process. To start with, only MgO powder is dispersed in a solution of $MgCl_2$ in water. The MgO starts to dissolve adding its ions to the aqueous solution. As more and more MgO dissolves the solution becomes supersaturated with respect to the magnesium oxychloride hydrate end product. Eventually nucleation takes place and the magnesium oxychloride hydrate precipitates out forming the Sorel cement. As free water is removed from the system, i.e., by formation of the hydrate, the solution of MgO is slowed and finally stopped. Therefore, the chemical make up of the resulting cement will vary depending on the vagaries of nucleation.

More particularly, if, for example, nucleation takes place early at only a few places, then supersaturation would be minimal and growth of the cement would be from these nucleation points, resulting in a series of widely separated zones rich in unreacted salt. If this nucleation took place on the surfaces of the MgO particles, as seems most likely, then the solution of MgO would thereby also be greatly inhibited. If, on the other hand, nucleation would be prevented at the MgO surface, and therefore did not take place until a much higher concentration of ions was present, and sufficient MgO was dissolved to react with all of the $MgCl_2$ present, then nucleation could take place spontaneously from many more sites producing a more heavily entwined crystal growth with little or no soluble salt left over. It is thus theorized by the present inventor that the poor water resistance of Sorel cement as so far known has been the result of too early and premature nucleation, such that if nucleation of the hydration reaction could be substantially inhibited, the very serious drawbacks of present Sorel cement formulae could be overcome.

It is in this vein that the Premix formula aspect of the present invention is directed. That is, the Premix seeding mixture is believed to cause precipitation of the magnesium oxychloride hydrate upon the Premix mu clei, as opposed to nucleation at the MgO surface, and to thus promote the solution of MgO into the $MgCl_2$ solution for yet further hydrate formation and subsequent precipitation.

As shown in the following Examples, the improved water resistance of the Sorel cement products obtained from the formulae of the present invention is evidenced by a decrease in weight loss and an increase in hardness or strength of the resulting product. The decrease in weight loss when exposed to water indicates that the constituents of the formulae are not leached out and the cement products remain stable. Improved strength of the resulting Sorel cement product after exposure to water, as compared to products prepared from conventional Sorel cement formulae and similarly exposed to water, is especially indicative of the improvements of the present invention. The ratio of wet strength—after immersion of the cement product in water—to dry strength is also indicative. All of these measurements provide quantitative proof of substantially improved Sorel cement products as compared to products obtained with conventional Sorel cement formulae. Visual observation of the resulting cement products, including the structural integrity thereof, also established the improvements flowing from the present invention.

The following examples are offered only for purposes of illustrating the invention and are in no way intended to limit the scope of protection to which the applicant is otherwise entitled.

EXAMPLE 1

Effect of Ethyl Silicate addition to Sorel cement

The following materials were mixed in the order and in the amounts listed below:

| Formula | | Control |
|---|---|---|
| Deionized water | 71 | 71 |
| $MgCl_2 . 6H_2O$ | 107 | 107 |
| MgO | 221 | 221 |
| Ethyl Silicate* | 5 | — |

*Silbond 50 was used which a trademarked product manufactured by Stouffer Chemical Company.

Twenty separate test samples were made with each formula of this Example. 50 gram samples were poured into polyethylene cups and allowed to harden for a period of 24 hours. They were then submerged in distilled water for a period of eight days and thereafter dried for an additional period of 24 hours in a 70° C. air circulating oven. All samples without ethyl silicate disintegrated into small grains. All samples containing ethyl silicate retained substantially all of their original physical characteristics and appearance.

When similar production sheets of Sorel cement were made using 5% chopped glass fiber in both the ethyl silicate-containing formula and in the control formula, the ratio of wet strength (24 hours of water submersion after seven days air cure) to dry strength increased from 30% to 85% in those samples that contained the ethyl silicate.

EXAMPLE 2

Effect of Nucleation Premix

The following materials were mixed in the order and in the amounts listed below:

| Formula | Lab. Scale grams | Plant Scale Kg. |
|---|---|---|
| Tap Water | 60.6 | 27.420 |
| $MgCl_2 . 6H_2O$ | 108.8 | 49.220 |
| Feldspar (Potassium Aluminosilicate) | 73.0 | 33.000 |
| Premix Formula (Seed) | 13.1 | 5.940 |
| MgO | 221.0 | 100.000 |
| Ethyl Silicate* | 4.9 | 2.200 |
| $H_2O_2$ (release agent) | 2.2 | 1.000 |
| | 403.6 | 218.78 |

*Silbond 50 was used which is a trademarked product manufactured by Stouffer Chemical Company.

Premix Formula

| | | |
|---|---|---|
| Deionized water | 35 | 1.250 |
| $MgCl_2 . 6_2O$ | 125 | 4.500 |
| MgO | 5 | 0.180 |
| | 165 | 5.930 |

The above Premix formula or seed was prepared by mixing the $MgCl_2.6H_2O$ and the water and heating the resulting solution to a temperature of about 110° to 120° C. While maintaining this temperature the MgO was added under conditions of constant stirring, and the mixture maintained under this condition for a period of about 10 minutes. The Premix formula was thereafter added to the main Sorel cement formula in the amounts as indicated above.

Production sheets containing 5% glass fiber were made with both a Premix-containing formula and a control formula without the Premix having been added thereto but otherwise the formula was the same in all respects.

After 7 days air cure:

The production sheets were formed by mixing the chopped glass fibers into both the Premix-containing formula of Example 2 and the control formula without the Premix and thereafter the resulting mixtures were sprayed into forms. After hardening for a period of 24 hours, the sheets were removed from the forms and stored at room temperature for a period of seven days. The boards were then cut up into small samples and the dry bending strength measured according to well known and generally practiced techniques.

The wet bending strength was similarly measured after subsequent submersion of the samples in water for a period of 24 hours:

| | Bending Strength $Kp/cm^2$ | |
|---|---|---|
| | Example 2 | Control |
| Dry | 586 | 380 |
| Wet | 391 | 282 |

The cement mixture of Example 2 and including the control, but not containing any glass fibers, was also cast into polyethylene cups (75 gms) and cured, i.e., hardened in air, for a period of 24 hours. The cured cements were then soaked in distilled water for a period of 24 hours and dried over a period of 24 hours at 70° C. in an air circulating oven under relative humidity conditions of 50% and 100%. The weight changes, based on the original wet weight, were as follows:

| | % of Initial Wet Weight | |
|---|---|---|
| | Example 2 | Control |
| cured at 100% RH | +0.3 | −9.8 |
| cured at 50% RH | −1.7 | −11.3 |

I claim:

1. A Sorel cement formula composition comprising magnesium chloride, magnesium oxide, water and ethyl silicate, said ethyl silicate being present in a water stabilizing effective amount.

2. A Sorel cement formula composition according to claim 1 wherein the ethyl silicate is present in an amount of from about 0.5–2% by weight based on the total weight of the formula.

3. A Sorel cement formula composition according the claim 1 which has added thereto glass fibers.

4. A Sorel cement formula composition according to claim 3 wherein the glass fibers are added in an amount of from about 1–10% by weight based on the total weight of the formula.

5. A Sorel cement formula composition according to claim 1 wherein said formula is cured under relatively saturated atmospheric conditions.

6. A Sorel cement formula composition comprising magnesium chloride, magnesium oxide, water and nucleating amount of a premix formula comprising the reaction product of water, magnesium chloride and a relatively small amount of magnesium oxide.

7. A Sorel cement formula composition according to claim 6 containing also ethyl silicate, said ethyl silicate being present in a water stabilizing effective amount.

8. A Sorel cement formula composition according to claim 6 wherein the premix formula is present in an amount of from about 1–5% by weight based on the total weight of the formula.

9. A Sorel cement formula composition according to claim 6 wherein the magnesium oxide of the premix formula is present therein in an amount such that substantially all of the magnesium oxide reacts with the magnesium chloride of the Premix formula.

10. A Sorel cement formula composition according to claim 6 which has added thereto glass fibers.

11. A Sorel cement formula composition according to claim 10 wherein the glass fibers are added in an amount of from about 1–10% by weight based on the total weight of the formula.

12. A Sorel cement formula composition according to claim 6 wherein said formula is cured under relatively saturated atmospheric conditions.

13. A process of manufacture of Sorel cement products which comprises admixing magnesium chloride, magnesium oxide, water and a water stabilizing amount of ethyl silicate to yield a Sorel cement formula and thereafter curing said formula.

14. A process according to claim 13 wherein the Sorel cement formula has added thereto glass fibers.

15. A process according to claim 13 wherein the Sorel cement formula is cured under relatively saturated atmospheric conditions.

16. A Sorel cement product obtained according to the process of claim 13.

17. A process of manufacture of Sorel cement products which comprises admixing magnesium chloride, magnesium oxide, water and a nucleating amount of a premix formula comprising the reaction product of water, magnesium chloride and a relatively small amount of magnesium oxide to yield a Sorel cement formula and thereafter curing said formula.

18. A process according to claim 17 wherein the Sorel cement formula has added thereto ethyl silicate in a water stabilizing effective amount.

19. A process according to claim 17 wherein the Sorel cement formula has added thereto glass fibers.

20. A process according to claim 17 wherein the Sorel cement formula is cured under relatively saturated conditions.

21. A Sorel cement product obtained according to the process of claim 17.

22. A Sorel cement product obtained according to the process of claim 18.

* * * * *

UNITED STATES PATENT AND TRADEMARK OFFICE
CERTIFICATE OF CORRECTION

PATENT NO. : 4,209,339
DATED : June 24, 1980
INVENTOR(S) : Robert Smith-Johannsen It is certified that error appears in the above-identified patent and that said Letters Patent are hereby corrected as shown below:

Column 6, line 8, reads "$MgCl_2 \cdot 6_2O$", should read

--$MgCl_2 \cdot 6H_2O$--

Signed and Sealed this

Twenty-seventh Day of January 1981

[SEAL]

Attest:

RENE D. TEGTMEYER

Attesting Officer     Acting Commissioner of Patents and Trademarks